US005237347A

United States Patent [19]

Teshigawara et al.

[11] Patent Number: 5,237,347

[45] Date of Patent: Aug. 17, 1993

[54] LATENT ELECTROSTATIC IMAGE OPTICAL WRITING APPARATUS

[75] Inventors: Toru Teshigawara; Kazuo Terao; Atsushi Kasao, all of Kanagawa, Japan

[73] Assignee: Fuji Xerox Co., Ltd., Tokyo, Japan

[21] Appl. No.: 780,390

[22] Filed: Oct. 23, 1991

Related U.S. Application Data

[63] Continuation of Ser. No. 553,341, Jul. 17, 1990, abandoned, which is a continuation of Ser. No. 140,678, Jan. 4, 1988, abandoned.

[30] Foreign Application Priority Data

Jan. 9, 1987 [JP] Japan .................................... 62-1686

[51] Int. Cl.[5] ........................ G01D 15/14; G03G 15/04

[52] U.S. Cl. .................................................... 346/160

[58] Field of Search ..................... 355/1, 71, 200, 228; 346/155, 160; 358/300

[56] References Cited

U.S. PATENT DOCUMENTS

| | | | |
|---|---|---|---|
| 4,435,064 | 3/1984 | Tsukada et al. | 355/1 |
| 4,447,126 | 5/1984 | Heidrich et al. | 355/1 X |
| 4,478,504 | 10/1984 | Tanaka | 355/1 |
| 4,502,062 | 2/1985 | Künst | 346/155 |
| 4,701,670 | 10/1987 | Watanabe et al. | 355/69 X |
| 4,721,977 | 1/1988 | Fukae | 355/229 |
| 4,730,203 | 3/1988 | Watanabe et al. | 346/160 |
| 4,803,565 | 2/1989 | Teshigawara et al. | 346/160 X |

FOREIGN PATENT DOCUMENTS

| | | |
|---|---|---|
| 58-38967 | 3/1983 | Japan . |
| 59-46740 | 3/1984 | Japan . |
| 59-49148 | 3/1984 | Japan . |
| 61-86767 | 5/1986 | Japan . |
| 61-110960 | 5/1986 | Japan . |

*Primary Examiner*—Fred L. Braun

*Attorney, Agent, or Firm*—Finnegan, Henderson, Farabow, Garrett & Dunner

[57] ABSTRACT

An optical writing apparatus whereby non-light-emitting portions that might exist between adjacent light-emitting elements arranged in parallel rows can be substantially eliminated either in the direction of the rows or in the direction perpendicular to the row direction. In addition, dotted latent electrostatic images can be formed in such a way that adjacent dots partially overlap with each other, thus contributing to improved image quality and resolution. Further, because light-emitting elements are connected to a common anode electrode, a reduced number of electronic devices is required to drive the elements.

6 Claims, 9 Drawing Sheets

FIG. 2
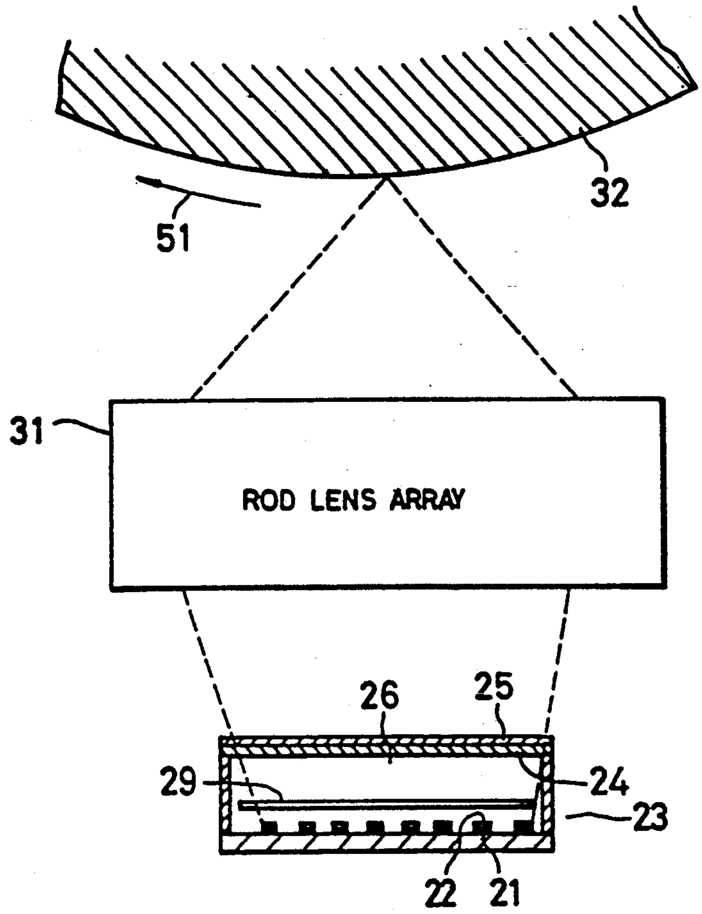
FIG. 3(a)
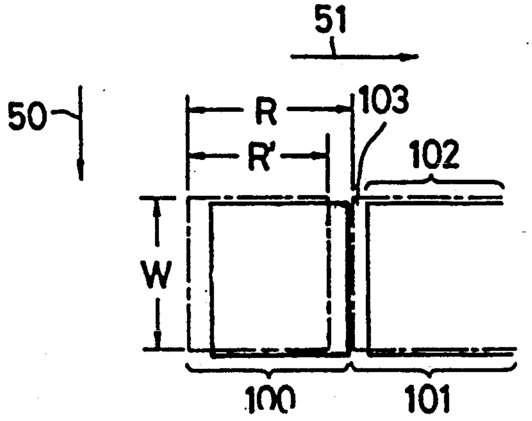
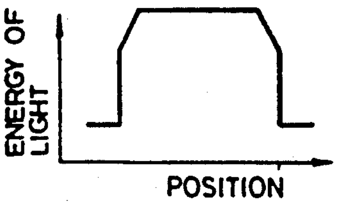
FIG. 3(b)

FIG. 6
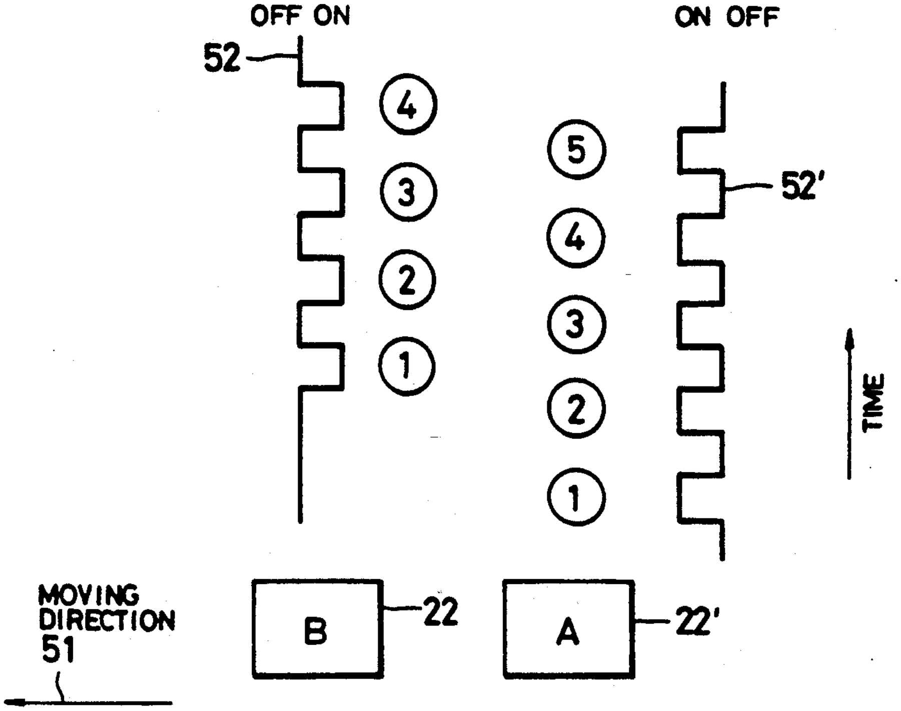
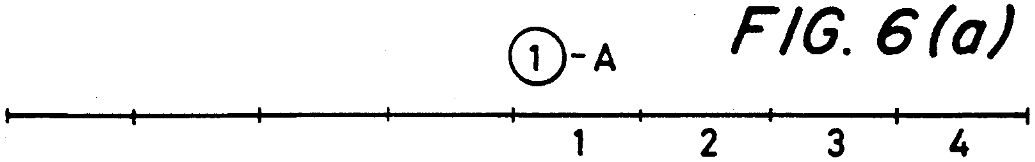
FIG. 6(a)
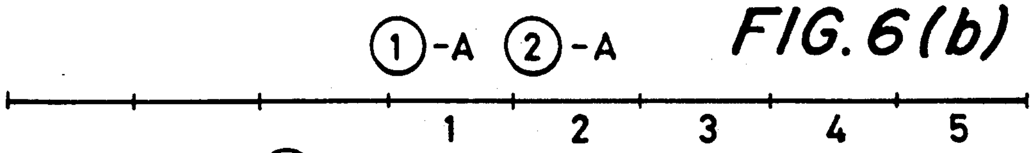
FIG. 6(b)
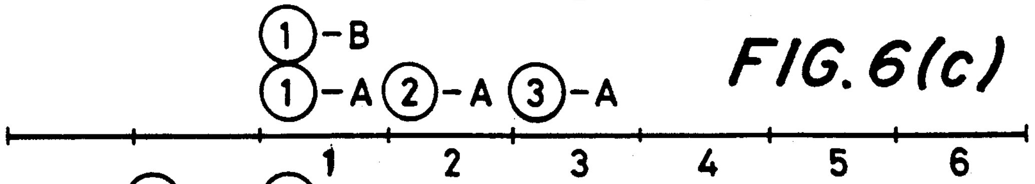
FIG. 6(c)
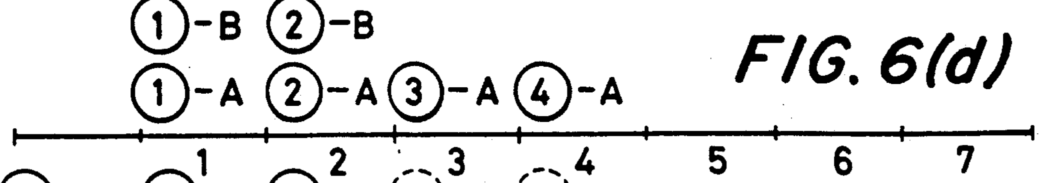
FIG. 6(d)
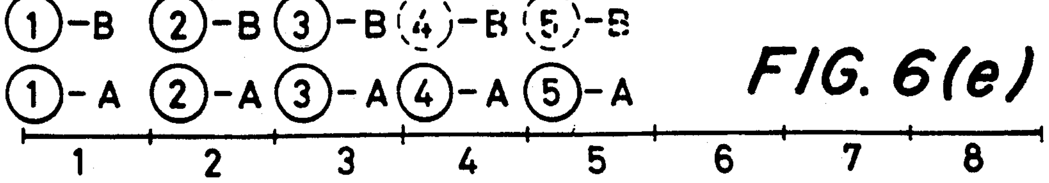
FIG. 6(e)

PRIOR ART FIG. 15
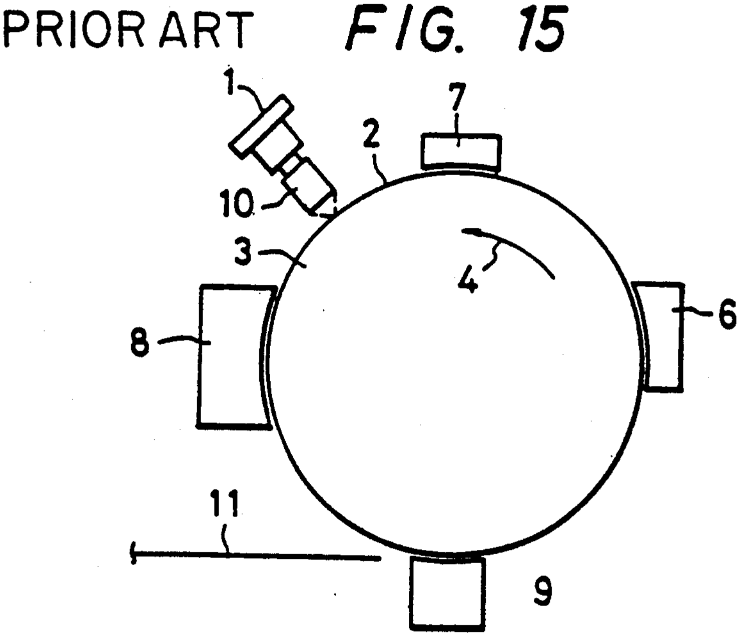
FIG. 16
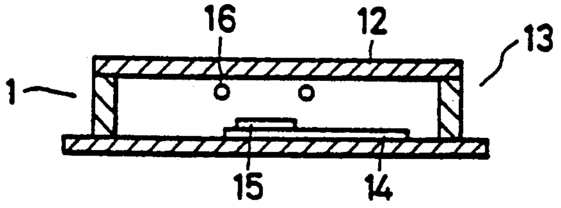
FIG. 17
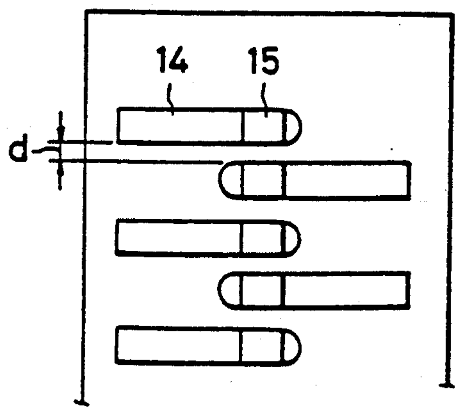

LATENT ELECTROSTATIC IMAGE OPTICAL WRITING APPARATUS

This application is a continuation of application Ser. No. 07/553,341, filed Jul. 17, 1990, now abandoned, which is a continuation of application Ser. No. 07/140,678, filed Jan. 4, 1988, now abandoned.

BACKGROUND OF THE INVENTION

The present invention relates to an optical writing apparatus that forms a latent electrostatic image on a photoreceptor by selectively activating a plurality of light-emitting elements in rows for light emission.

FIG. 15 is a schematic diagram of a known copier which forms a latent electrostatic image on the surface of a photoreceptor 2 using an optical writing head 1 in which light-emitting elements are arranged in rows. The photoreceptor 2 is a layer that surrounds the outer surface of a light-sensitive drum 3, which is coupled to a drive unit (not shown) in such a way that the drum is rotated in the direction indicated by arrow 4. Also disposed around the light-sensitive drum 3 are a charge corotron 7, the optical writing head 1, a light concentrating lens system 10, a developer 8, a transfer corotron 9, and a cleaning unit 6.

As the light-sensitive drum 3 is rotated in the direction of arrow 4, a uniform charge layer is formed on the surface of the photoreceptor 2 by means of the charge corotron 7 and the photoreceptor 2 is thereafter illuminated with light from the writing head 1 so as to form a latent electrostatic image. The lens system 10, which concentrates on the photoreceptor 2 light issuing from the plurality of light-emitting elements in the head 1, consists of an array of focusing rod-shaped lenses.

The latent electrostatic image on the photoreceptor 2 is subsequently rendered visible by passage under a developer 8. The resulting toner image on the photoreceptor 2 is transferred to a copy sheet 11 by means of a transfer corotron 9, the sheet 11 being discharged after the toner pattern is fixed by a fixing unit (not shown). The photoreceptor 2 is cleaned of any residual electrostatic image by a cleaning unit 6 and conditioned for another cycle.

The internal structure of the writing head 1 which is used in the manner described above is shown in FIGS. 16 and 17. FIG. 16 is a cross-section of the head, and FIG. 17 is a plan view showing the essential part of the head.

As shown in FIG. 16, a transparent partition 12 is provided on top of an evacuated air-tight case 13 which contains anode electrodes 14. As shown in FIG. 17, each of the anode electrodes 14 is in the form of a tongue which is coated at one end with a phosphor 15 on its top surface. In the following description of the present invention, this phosphor is referred to as a light-emitting element 15.

Cathodes 16 comprising a plurality of filaments are provided beneath the transparent partition 12. When the cathodes 16 are heated by an electric current flowing therethrough, thermions are emitted. If the cathodes 16 are connected to ground and the anode electrodes 14 are supplied with a positive voltage, the emitted thermions will flow toward the anode electrodes 14 and strike the light-emitting elements 15, causing light emission.

As shown in FIG. 17, the anode electrodes 14 are arranged parallel to one another and spaced at equal distances in such a manner that they are partially interleaved with each other. The anode electrodes 14 are electrically insulated from one another and are connected to a drive circuit (not shown) that provides for selective application of a predetermined positive voltage to individual anode electrodes. According to this system, the light-emitting elements 15 are selectively excited for light emission, thereby forming a latent electrostatic image on the surface of the photoreceptor 2. As a result of light emission from one element 15, a single dot of a latent electrostatic image is formed on the surface of the photoreceptor 2. This dot provides a minimum unit of the latent electrostatic image, namely, one pixel of a developed image.

Japanese Unexamined Patent Application Publications Nos.38967/1983, 49148/1984 and 46740/1984 address other various optical writing head configurations.

The known optical writing head 1, discussed above, has various problems. First, the linear arrangement of light-emitting elements 15 requires a certain distance d to be provided between adjacent elements 15, as shown in FIG. 17. The distance d is necessary to ensure reliable electrical insulation between adjacent anode electrodes 14 carrying light-emitting elements 15, and as an inevitable result, a non-light-emitting portion is formed between adjacent light-emitting elements 15. If the optical writing head 1 having such non-light-emitting portions is used to form a latent electrostatic image on the surface of photoreceptor 2, residual charges will be incompletely neutralized in that part of the photoreceptor which faces the non-light-emitting portions. This can be the cause of deterioration of a developed image when the light-emitting elements 15 are seen in the principal scanning direction, or in the direction in which the elements are aligned.

Furthermore, if a mismatch occurs between the speed of rotation of the photoreceptor 2 and the timing of light emission from elements 15, part of the photoreceptor 2 will fail to be illuminated with an adequate amount of light, thus causing deterioration of a developed image when the light-emitting elements 15 are seen in the auxiliary scanning direction, or in the direction in which the elements move, as indicated by arrow 4 in FIG. 5.

Another problem with the previously known optical writing head 1 is that in order to ensure that the individual light-emitting elements 15 can be turned on and off independently of one another, the drive circuit requires as many drive elements and associated drive circuits as light-emitting elements 15. This disadvantageously increases the overall cost of the equipment.

SUMMARY OF THE INVENTION

Accordingly, it is an object of the present invention to provide an optical writing apparatus in which the light-emitting elements are arranged to minimize the residual charges formed on the surface of the photoreceptor.

Another object of the present invention is to provide an optical writing apparatus that allows for simplification of the drive circuit and reduction of its cost.

A further object of the present invention is to provide an optical writing apparatus that is capable of producing an arrangement of dotted latent electrostatic images in such a way as to ensure the formation of a high-quality image after development.

These and other objects and advantages of the invention will be set forth in part in the description which follows, and in part will be obvious from the description, or may be learned by practice of the invention.

The objects and advantages of the invention may be realized and attained by means of the instrumentalities and combinations particularly pointed out in the appended claims.

An optical writing apparatus is provided which employs at least two parallel rows of light-emitting elements arranged at a predetermined pitch. The light-emitting elements are arranged such that they are aligned at equal pitches when viewed in a direction perpendicular to the direction of the rows.

A matrix of dotted latent electrostatic images is formed by positioning a photoreceptor in a face-to-face relationship with the rows of light-emitting elements which are then alternately excited to emit light. The photoreceptor is then scanned in a direction perpendicular to the rows and a line of dotted latent electrostatic images is written on the photoreceptor when the light emission from all rows is completed. This method of optical writing is characterized in that a pattern of light emission is selected so as to satisfy the following relation:

$$1/\sqrt{2} \leqq R/l < \sqrt{2}$$

where R denotes the width of a dotted latent electrostatic image in the direction perpendicular to the direction of the rows, and l is the pitch at which said latent electrostatic images are arranged.

The accompanying drawings, which are incorporated in and constitute a part of this specification, illustrate one embodiment of the invention and, together with the description, serve to explain the principles of the invention.

BRIEF DESCRIPTION OF THE DRAWINGS

FIG. 2 is a cross-section of the writing head shown in FIG. 1, illustrated in conjunction with the rod lens array and photoreceptor of the present invention;

FIGS. 3(*a*), 3(*b*), 4(*a*) and 4(*b*) illustrate the overlapping of dotted latent electrostatic images formed on the surface of a photoreceptor, as well as the effect that results from this overlap;

FIGS. 6(*a*)–6(*e*) shows the sequence of steps of forming dotted latent electrostatic images using the writing head shown in FIG. 5;

FIG. 15 is a schematic diagram of a photocopier that is suitable for implementing the optical writing apparatus of the present invention;

FIG. 16 is a cross-section of a known optical writing head; and

FIG. 17 is a plan view showing an essential part of the head shown in FIG. 16.

DETAILED DESCRIPTION OF THE PREFERRED EMBODIMENT

Reference will now be made in detail to the present preferred embodiment of the invention, an example of which is illustrated in the accompanying drawings.

The present invention is directed toward an optical writing apparatus wherein a first row of light-emitting elements is excited to form dotted latent electrostatic images on the surface of a photoreceptor with one electrostatic image being spaced from an adjacent electrostatic image when viewed in the direction of the row of light-emitting elements. A second row of light-emitting elements is then excited so that dotted latent electrostatic images are formed in areas between the previously formed electrostatic images. If there are three or more rows of light-emitting elements, the above procedures are sequentially repeated so as to form a row of dotted latent electrostatic images that are arranged in a row with no gap being left between adjacent dots. In other words, every row of light-emitting elements is excited to effect light emission and dotted latent electrostatic images corresponding to one complete line of light-emitting elements are formed when single light emission from all rows of such elements has been completed.

If the photoreceptor is scanned in a direction perpendicular to the direction of the rows of light-emitting elements, dotted latent electrostatic images can be formed in a regular pattern or matrix consisting of vertical and horizontal lines of dots. If dotted latent electrostatic images are formed on the surface of the photoreceptor in such a way that the width of an individual image, R, measured in a direction perpendicular to the direction of the rows is greater than the pitch, l, at which the images are arranged, the dotted electrostatic images will partially overlap one another. This offers the advantage that even if a slight mismatch occurs between the speed at which the photoreceptor is scanned in the auxiliary scanning direction and the timing of light emission from an individual light-emitting element, it is ensured that no gap will be left between adjacent dots of the latent electrostatic image as seen in the direction of auxiliary scanning.

Head Structure

Figure 1:
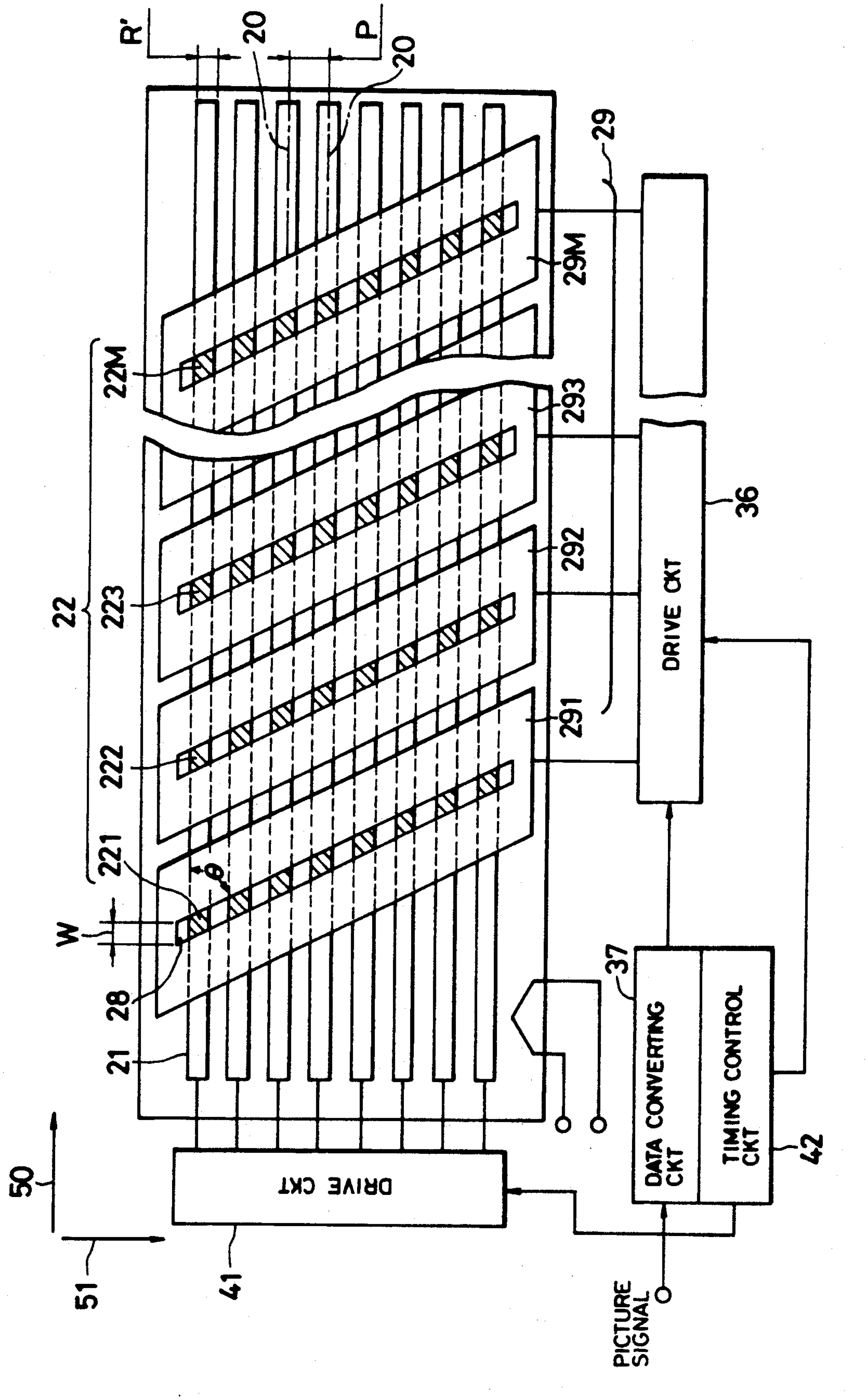
FIG. 1 is a plan view showing an essential part of an optical writing head of the present invention.

FIG. 1 is a plan view showing the principal part of an optical writing head of the present invention.

In FIG. 1, eight strips of anode electrode 21 are spaced parallel to each other at equal distances in the longitudinal direction of the optical writing head (i.e., in the direction indicated by arrow 50). A given number (M) of light-emitting elements 221–22M are provided in selected areas (hatched in FIG. 1) of each anode electrode 21. A row of these M-numbered light-emitting elements 221–22M on each of the anode electrodes 21 is hereinafter referred to as a row of light-emitting elements 22. The direction indicated by arrow 50 in FIG. 1 is referred to as the "row direction" of light-emitting elements 22, and the direction indicated by arrow 51 is referred to as the "direction perpendicular to the row direction" of light-emitting elements 22.

The light-emitting elements 221–22M in the row 22 are arranged in such a way that when viewed in the direction 51 perpendicular to the row direction, any two adjacent light-emitting elements are spaced at an equal pitch in the row direction. Therefore, if the width, W, of each of the light-emitting elements in the row direction is equal to the pitch at which the light-emitting elements are arranged in the row direction, M×8 light-emitting elements 22 will be arranged at a pitch of W in such a way that there is no gap between any two adjacent elements when viewed in the direction 51 perpendicular to the row direction.

In the embodiment shown in FIG. 1, the size R' of each light-emitting element in the direction perpendicular to the row direction is selected to be 1/10 mm. The distance P between the center lines 20 of any two adjacent rows of light-emitting elements 22 (each of the center lines 20 being parallel to the row direction 50) is selected to be 17/96 mm. The width W of each light-emitting element in the row direction is 1/12 mm. The pitch at which adjacent elements of individual rows of light-emitting elements 22 are spaced, that is, for example, the distance between the center of a light-emitting element 221 and that of an adjacent element 222, is selected to be 8/12 mm. The two sides of each light-emitting element that are inclined to the row direction 50 form an angle of approximately 64.5 degrees with respect to the row direction.

In the present invention, it is also important to select an appropriate value of the distance P between the center lines 20 of any two adjacent rows of light-emitting elements 22. This will be discussed in detail following the description of the operating principle of the light-emitting elements.

FIG. 2 is a cross-section of the optical writing head shown in FIG. 1. The top of a gas-tight case 23 is covered with a transparent partition 24 which has a surface coating of anti-reflection layer 25. Contained in the case 23 are two cathodes 26 in filament form, anode electrodes 21, rows of light-emitting elements 22 in the form of a phosphor provided on top of the anode electrodes, and grids 29 each having a slit in the center.

As is evident from FIGS. 1 and 2, the light-emitting elements 221–22M are visible when viewed from the photoreceptor 32 through the rod-shaped lens array 31 and the slits 28 in grids 29. The number of grids 29, M, is equal to the number of light-emitting elements in each row 22.

Dotted Latent Electrostatic Images

As shown in FIG. 2, light emitted from the individual rows of light-emitting elements 22 passes through the transparent partition 24 and is converged on the surface of photoreceptor 32 by means of the rod-shaped lens array 31. In the present embodiment, the rod-shaped lens array 31 forms an optical system featuring a magnification of unity. Therefore, if one of the light-emitting elements in each row 22 emits light when the photoreceptor 32 is at rest, a dotted latent electrostatic image of the same size as the light-emitting element is formed on the surface of the photoreceptor 32. When this image is developed and transferred onto a copy sheet, a pixel of the same size is formed in the transfer image.

In fact, however, the photoreceptor 32 moves in the direction of arrow 51 during light emission from the individual rows of light-emitting elements 22. Therefore, each of the dotted latent electrostatic images formed on the surface of photoreceptor 32 is somewhat longer than the size of each light-emitting element when viewed in the direction of arrow 51.

FIG. 3(*a*) shows schematically a latent electrostatic image formed in a dot form on the surface of a photoreceptor. In FIG. 3(*a*), each light-emitting element has a length of R' (the size measured in the direction of arrow 51) and a width of W (the size measured in the direction of arrow 50). The light-emitting elements are parallelepiped in shape but, for the sake of simplicity, the following discussion assumes that the elements have a rectangular shape.

If the photoreceptor moves in the direction of arrow 51 while one light-emitting element is emitting light, a dotted latent electrostatic image 100 having a length of R, where (R>R'), and a width of W will form on the surface of the photoreceptor. This means that the photoreceptor has moved by a distance of (R−R') during light emission.

In order to neutralize residual charges, the photoreceptor must be flooded by illumination. As shown in FIG. 3(*a*), the hatched area of latent electrostatic image 100 is constantly illuminated by light emitted from the light-emitting elements. The remaining unhatched area of image 100 is not illuminated in either the first or second half of the period of light emission.

The energy of the illuminated light as a function of the position on the photoreceptor is depicted in FIG. 3(*b*). As shown therein, the photoreceptor receives somewhat less light energy at either end of the dotted latent electrostatic image 100. However, the difference between the length of a dot R and the length of a light-emitting element R' is so small that the effect it exerted upon the quality of a developed image is substantially negligible for practical purposes.

After a single dot of latent electrostatic image 100 has been formed, the photoreceptor moves in the direction of arrow 51, whereupon the same light-emitting element is excited to emit light, thereby forming a similar dot of latent electrostatic image 101 immediately adjacent the already formed image 100.

If a mismatch occurs in previously known devices between the speed at which the photoreceptor rotates in the direction of arrow 51 and the timing of light emission from light-emitting elements, a slightly offset latent electrostatic image 102 will be formed. In this case, the residual charges will not be neutralized in the area of the photoreceptor corresponding to the gap 103 between the two dots 100 and 102. The unneutralized charges will produce a black streak after development, thereby causing serious image deterioration.

Therefore, in the present invention, a pattern of light emission is selected such that the size, R, of a dotted latent electrostatic image 100 in the direction of arrow 51 is greater than the pitch at which any two adjacent dots are arranged. In other words, any two adjacent dots of latent electrostatic image partially overlap each other when looked at in the direction of arrow 51. This is effective in absorbing any unevenness in the moving speed of the photoreceptor.

Figure 4A:
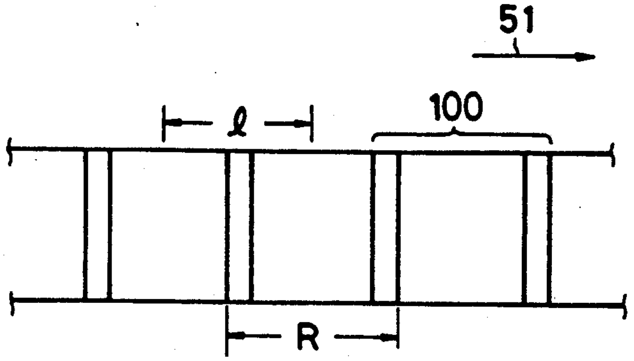
Figure 4B:
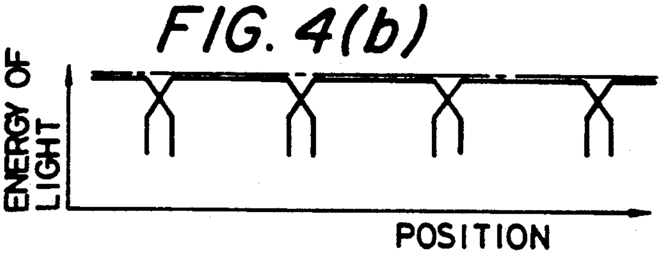

An additional advantage of selecting this pattern of light emission will be apparent from FIG. 4(*b*). The light energy received by the photoreceptor in an area corresponding to an edge of one dotted latent electrostatic image is added to the energy received by an area where it overlaps an edge of an adjacent image so as to produce a flat and uniform distribution of light energy in the direction of arrow 51. This is indicated by the long-and-short dashed line.

Drive Circuitry

Four grids 29 are shown, for example, in FIG. 1 but the number of grids may be increased to any value as required and, in the case of a head having a width equal to the shorter side of a B4 size sheet (257 mm), a total of 384 grids are provided. As shown in FIG. 1, a plurality of grids 291–29M are connected to a drive circuit 36. The anode electrodes 21 are also connected to a drive circuit 41. The drive circuitry for the writing head also includes a data converting circuit 37 that supplies a picture signal to the drive circuit 36 and a timing control circuit 42 that sends a control signal to the drive circuit 41. These circuits perform a "dynamic drive" on the optical writing head in the following manner.

Drive circuit 36 increases the potential of grids 291–29M to the ON level or decreases the potential to the OFF level depending upon the content of a picture signal supplied. The drive circuit 41 cyclically increases the potential of anodes electrodes 21 to the ON level exclusively.

If the data converting circuit 37 supplies the drive circuit 36 with a picture signal for a white pixel, the drive circuit 36 increases the potential of a corresponding grid 29 to the ON level, whereupon thermions generated from the cathodes 26 flow toward the anode electrodes 21. As a result, the light-emitting elements on the anode electrode 21 beneath the grid 29 which have been excited to the ON potential will emit light. Any residual charges in the illuminated area of the photoreceptor 32 are then neutralized. In the development process, no toner particles will be deposited on this neutralized area, thereby producing a white pixel.

If the potential of grid 29 is reduced to the OFF level, all of the light-emitting elements lying just beneath the grid 29 stop emitting light and neutralization of residual charges on the surface of photoreceptor 32 is not effected. Toner particles are then deposited on the charged area of the photoreceptor, thereby producing a black pixel.

As a result, the optical writing head of the present invention depends upon the turning on or off of grids 29 to select between two modes of operation, namely erasing a dot of latent electrostatic image to form a white pixel or of not neutralizing any residual charges to produce a black pixel. At the same time, the potential of anode electrodes 21 is cyclically increased to the ON level exclusively, so as to determine the timing of printing for each row of light-emitting elements.

The drive circuits 36 and 41 perform the above described controls. The function of the drive circuit 36 is to perform serial-to-parallel conversion on a picture signal, latch the parallel signal for a predetermined period of time, and supply the picture signal to an associated grid 29. The drive circuit 36 comprises a plurality of shift registers, etc. The timing control circuit 42 supplies the drive circuit 36 with a clock signal that controls the transfer and selection of picture signals to be sent to the drive circuit 36. The drive circuit 41 is also controlled by the timing control circuit 42 in such a way that it is synchronized with the turning on and off of grids 29 to cyclically increase the potential of eight anode electrodes 21 to the ON level exclusively. The data converting circuit 37 picks up the serially supplied picture signals and sends them to the drive circuit 36 in a predetermined order.

The drive circuit 36 holds in store as many picture signals as grids 29, that is, the number of picture signals stored in the drive circuit 36 is M. A matrix of dotted latent electrostatic images to be formed on the surface of the photoreceptor consists of $8\times M$ dots. For the purpose of the following discussion, the picture signals for this dot matrix are referred to as D1, D2, D3, D4, D5, etc.

In response to a first timing signal from the timing control circuit 42, D1 and every eighth picture signal D9, D17, D25, etc. are latched in the drive circuit 36. The first row of light-emitting elements 22 is the N driven with the drive circuit 36 to emit light. In response to a second timing signal, D2 another set of every eighth picture signal D10, D18, D26, etc. is latched in the drive circuit 36, whereupon the second row of light-emitting elements 22 is excited to emit light. Processing of the picture signals for a full dot matrix is accomplished by repeating this operation a total of 8 times. In this case, the time required to perform eight operations of light emission is set to be equal to the time required to complete the writing of one line of information, as will be discussed in detail later in this specification.

Theory of Operation

Figure 5:
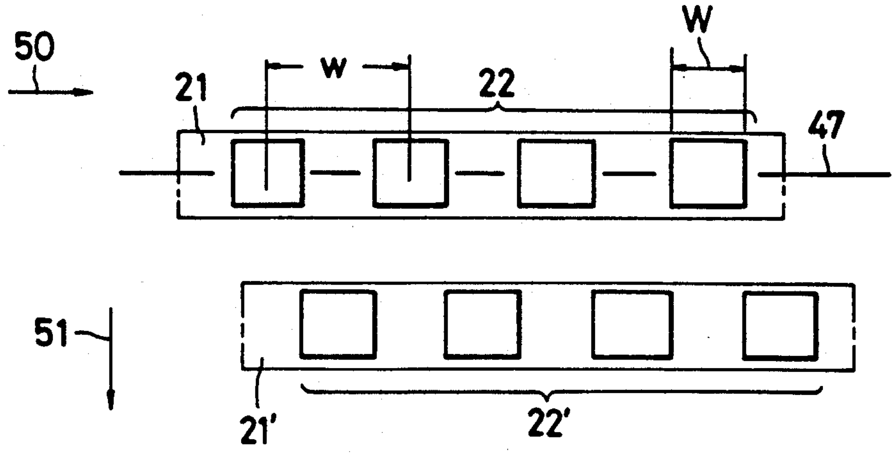
FIG. 5 is a plan view that shows an essential part of an optical writing head in order to illustrate the theory of its operation.

FIG. 5 shows, at an enlarged scale, an essential part of the optical writing head of the present invention in order to explain the theory of its operation. For the sake of clarity, only two rows of light-emitting elements are shown in FIG. 5 and no other components such as grids and drive circuits are shown.

Two anode electrodes 21 and 21' are provided in the head and two rows of light-emitting elements 22 and 22' are provided on the respective anode electrodes.

If the two parallel rows of light-emitting elements are looked at in a direction perpendicular to the direction of the rows, i.e., in the direction of arrow 51, all of the light-emitting elements appear as if they were arranged at equal pitches of $\omega/2$. In the present embodiment, the pitch $\omega/2$ is equal to the width of each light-emitting element, W.

In operation, the upper row of light-emitting elements 22 is excited to emit light and a latent electrostatic image is formed in that area of the photoreceptor which faces the upper row of light emitting elements. Then, the photoreceptor makes a relative movement with respect to the row 22 in the direction of arrow 51 and an imaginary straight line 47 that is drawn on the surface of the photoreceptor comes into registration with the lower row of light-emitting elements 22'. The lower row is then excited to emit light, thus forming a corresponding latent electrostatic image.

The result of these operations is essentially the same as the results achieved by forming a line of dotted latent electrostatic images by employing light-emitting elements that are arranged closely enough to leave no gap between any two adjacent elements.

If the two rows of light-emitting elements 22 and 22' are alternately excited to perform repeated light emission in a predetermined order while the photoreceptor moves in synchronism in the direction of arrow 51, a matrix of dotted latent electrostatic images will form in which the electrostatic images in a dot form are arranged in rows and lines in an orderly fashion.

Formation of Latent Electrostatic Images in a Direction Perpendicular to Row Directions FIG. 6 illustrates the theory of the operation of forming latent electrostatic images using the optical writing head shown in FIG. 5. The block designated A in FIG. 6 represents light-emitting elements in the row 22' and the block designated B represents light-emitting elements in the row 22. It is supposed in FIG. 6 that the photoreceptor makes a relative movement in the direction of arrow 51. The relative movement of the photoreceptor may be achieved either by moving the photoreceptor itself or by moving the rows of light-emitting elements.

The timing of signals input to the light-emitting elements A and B is indicated by two vertical time axes depicted over the respective blocks. For the sake of clarity, the following discussion assumes that the duration of light emission from each block is extremely short and that there is no relative movement of the photoreceptor during light emission.

Timing pulses 52 and 52' are applied to impress a voltage on anode electrodes 21 and 21', respectively, in order to perform writing with the light-emitting elements A and B. In FIG. 6, the symbol ON indicates that the potential of an anode electrode is at the ON level whereas OFF indicates that the potential of the anode electrode is at the OFF level. Numerals (1) to (5) denote picture signals for five lines, (1) referring to the first line, (2) to the second line, etc. In the embodiment shown in FIG. 6, elements A and B alternately emit light five times in such a way that a total of five lines of dotted latent electrostatic images are formed. Horizontal axes (a) to (e) sequentially show the status of the latent electrostatic images formed on the surface of the photoreceptor immediately after light emission from each line of light-emitting elements. For example, designation (1)-A indicates that the first line of dotted latent electrostatic images has been formed on the designated position by light emission from element A. If radiations of light from the two rows of elements 22' and 22 (A and B) overlap in strips (designated by numerals 1-8 in FIG. 6) perpendicular to the sheet on the photoreceptor, a line of dotted latent electrostatic images will be formed, as described with reference to FIG. 5, with no gap being left between any two adjacent images.

The sequence of operations shown in FIG. 6 is hereunder described in greater detail. First, the potential of anode electrode 21, shown in FIG. 5, for row A of light-emitting elements is increased to the ON level. In this case, the potential of grid 29, shown in FIG. 1, lying above the light-emitting element to be excited for light emission is increased to the ON level or decreased to the OFF level depending upon the nature of picture signal (1), depending on whether the formation of a white or black pixel is desired. As a result, a latent electrostatic image (1)-A on the first line is formed on a strip 1 in the photoreceptor by means of light emission from the row A of light-emitting elements.

In the next step, the potential of anode electrode 21 for the row A of light-emitting elements is again increased to the ON level and the potential of grid 29 is increased to the ON level or decreased to the OFF level depending upon the nature of picture signal (2).

By means of light emission from row A of light-emitting elements, a latent electrostatic image (2)-A on the second line is formed on a strip 2, as shown in FIG. 6(*b*). By this time, the photoreceptor has made a relative movement of one line (i.e., by the amount equivalent to the width of strips 1-8) in the direction of arrow 51.

After the photoreceptor has made this amount of relative movement, the row B of light-emitting elements takes part in forming a latent electrostatic image in response to a picture signal (1) for the first line. In this situation, the latent electrostatic image designated (1)-A has come to a position immediately beneath the row B of light-emitting elements. The latent electrostatic image (1)-B formed by row B is just wide enough to fill the gap formed in the image designated (1)-A. These steps complete the formation of all latent electrostatic images for the first line, as shown in FIG. 6(*c*).

In response to a subsequent timing signal, a latent electrostatic image (3)-A in the third line is formed by the row A of light-emitting elements before the photoreceptor makes another movement. Then, the photoreceptor is caused to make another relative movement and the formation of a latent electrostatic image (2)-B by the row B of light-emitting elements is completed by the procedures already described, as shown in FIG. 6(*d*). By repeating the sequence of these operations, five lines of latent electrostatic images can be successively formed after passing through the stage shown in FIG. 6(*e*).

In the above-described embodiment of the present invention, light-emitting elements are excited to emit light for a given duration of time while the photoreceptor is moving relative to the light-emitting elements and the duration of light emission, its timing and the moving speed of the photoreceptor are selected in such a way that any two adjacent dots of latent electrostatic image partly overlap with each other in the direction of the relative movement of the photoreceptor (i.e., in the direction of arrow 51) as illustrated in FIG. 4.

For the purposes of the present invention, it suffices that two adjacent dots of latent electrostatic image partially overlap each other. However, experimentation by the present inventors has shown that if the width of the overlap between the two dots exceeds the square root of two times the dot width in the same direction, then the adjacent pixels disadvantageously interfere with each other to deteriorate, rather than improve, the image quality. In order to avoid this problem, the dot width (R) and the pitch (l) at which adjacent dots are spaced are set to satisfy the following relationship:

$$1/\sqrt{2} \leqq R/l < \sqrt{2}.$$

If this condition is met, the present optical writing head is capable of forming a matrix of latent electrostatic images using light-emitting elements that are virtually arranged at such a high density as to leave no gap between adjacent elements. In addition, rows of these elements are driven by increasing the potential of a plurality of anode electrodes on such rows exclusively to the ON level, so that the number of switching transistors required in the drive circuit 36 to drive grids 29 is only a fraction of the total number of light-emitting elements required to write one line of latent electrostatic images.

Selection of the Distance Between Adjacent Rows of Light-Emitting Elements

Figure 8:
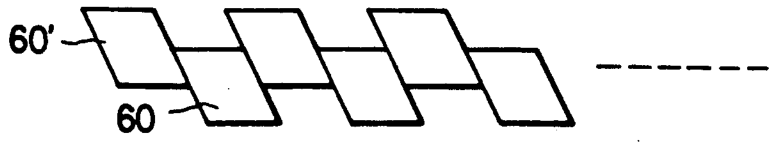

The foregoing is the description of the theory of alternate light emission from two rows of light-emitting elements. In this case, it must be taken into consideration that the photoreceptors make a relative movement at a constant speed during the time interval between light emission from one row of light-emitting elements and light emission from the other row, and if such a movement occurs, the resulting dots of latent electrostatic image 60 and 60' will be offset in the row direction as shown in FIG. 8.

A method that can be employed to avoid this problem is described hereinafter. To simplify the description, it is assumed that the duration of light emission from each light-emitting element is extremely short and that no relative movement of the photoreceptor occurs during the period of light emission.

Figure 7A:
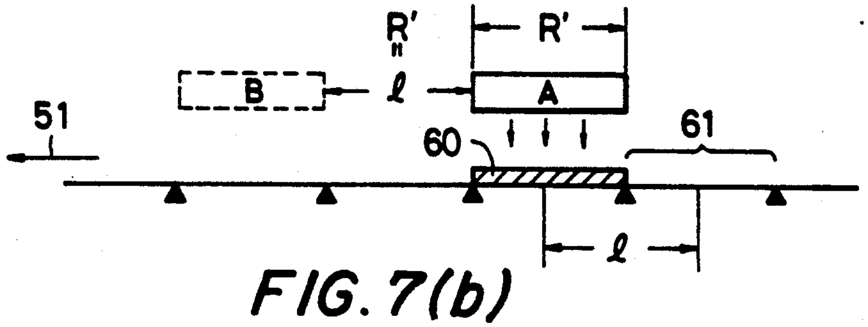
FIGS. 7(*a*), 7(*b*), 8, 9(*a*)–9(*c*), 10, 11(*a*), 11(*b*), 12 and 13(*a*)–13(*c*) illustrate methods that may be used to determine the distance between the center lines of two rows of light-emitting elements in a writing head.
Figure 7B:
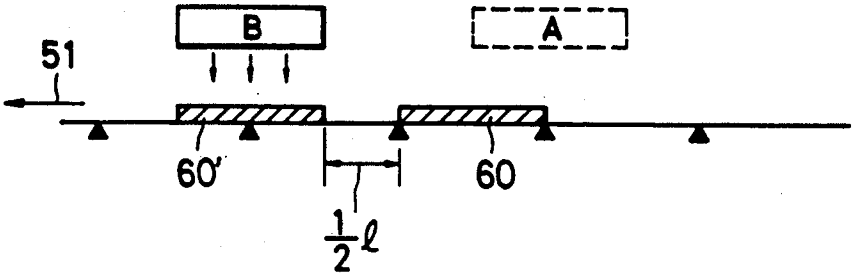

FIG. 7 shows the case where the direction 51 in which the photoreceptor moves coincides with the direction in which the light emission is shifted from row A to row B. In the embodiment shown in FIG. 7, R', which represents the size of each light-emitting element in the direction perpendicular to the row direction, is equal to the distance between the two rows of elements A and B. It is also assumed in this embodiment that the pitch at which two adjacent dots of latent electrostatic images are arranged in the direction perpendicular to the row direction is equal to R'.

As shown in FIG. 7(*a*), the row A of light-emitting elements forms a cyclic light emission in such a way that after formation of a latent electrostatic image 60, a time T exists before another latent electrostatic image is formed in a strip of zone 61.

Since the driving of the two rows of light-emitting elements A and B, is independent of each other, the row B in a writing head of the two-row design shown in FIG. 5 must be excited to emit light half of the time (T/2) after the light emission from row A. But, as shown in FIG. 7, row B forms a latent electrostatic image 60' which is situated a distance l/2 away from the latent electrostatic image 60 previously formed by row A. By adjusting the duration of light emission from the two rows, A and B, of light-emitting elements, the resulting latent electrostatic images thus formed are staggered in the direction of the rows. Specifically, as shown in FIG. 8, the latent electrostatic images 60 which are formed by the row A of light-emitting elements are staggered with the images 60' formed by the row B.

In order to prevent this problem, in the present invention the distance between the two rows A and B of light-emitting elements is selected at a value 1.5 times the value of l.

Figure 9A:
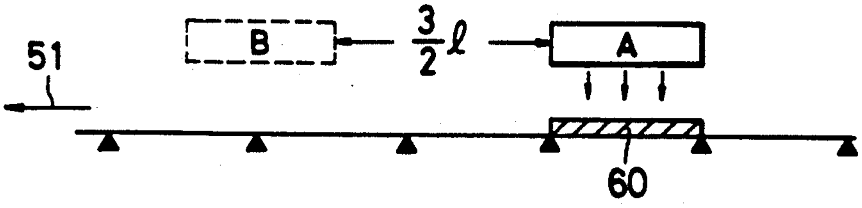
Figure 9B:
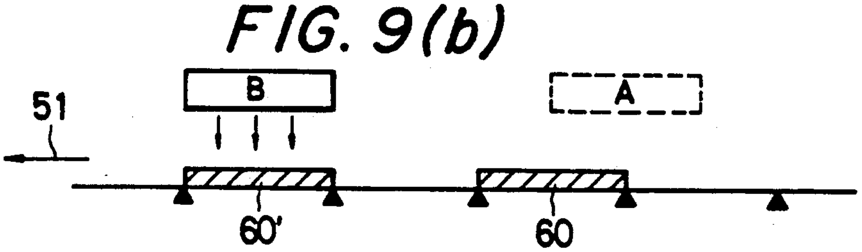
Figure 9C:
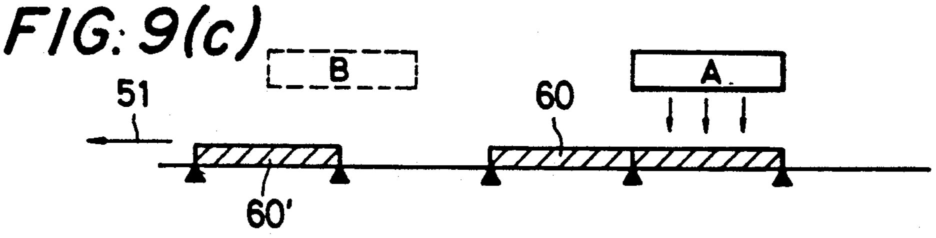
Figure 10:
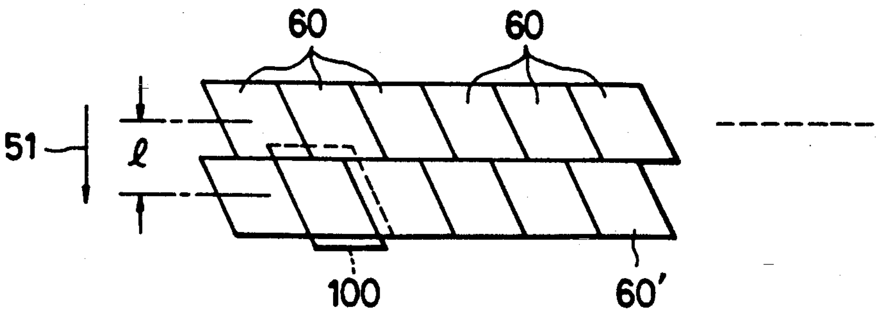

If the distance between rows A and B is set at 3 l/2, the distance between the latent electrostatic image 60 formed by light emission from row A, as shown in FIG. 9(*a*), and the image 60' subsequently formed by light emission from row B is Then, as shown in FIG. 10, the series of dotted latent electrostatic images 60 and 60' will be aligned without being offset and the two rows of latent electrostatic images are arranged at a pitch of l in a direction perpendicular to the row direction.

If, under these conditions, each row of light-emitting elements is excited to emit light for a finite period of time, dots of latent electrostatic images 60 or 60' are elongated in the direction of arrow 51 to produce an overlap between adjacent dots. One example of such an elongated dot image 100 is shown in FIG. 10 by a dashed line.

Figure 11A:
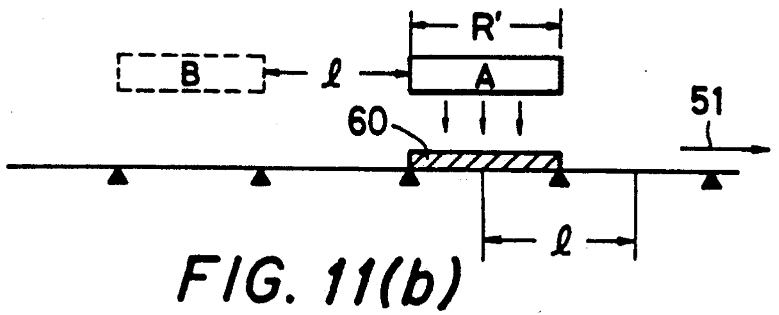
Figure 11B:
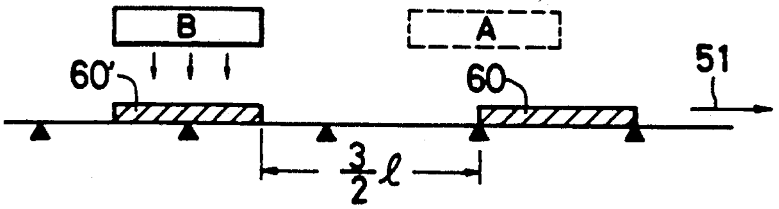
Figure 11C:
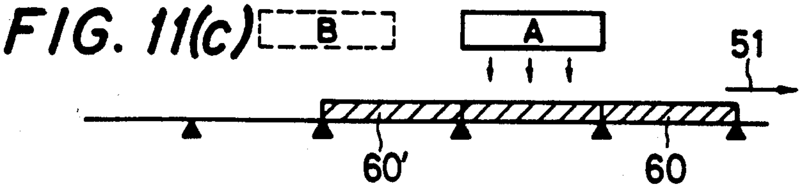

FIG. 11 shows the case where the moving direction 51 of the photoreceptor is opposite to the direction in which light emission is shifted from the row A of light-emitting elements to the row B. In such a case, the timing of supplying picture signals to the two rows of light-emitting elements must be opposite to the case shown in FIG. 6.

The embodiment shown in FIG. 11(*a*) also assumes that R', the size of each light-emitting element in the direction perpendicular to the row direction, is equal to l, or the distance between the two rows A and B. If this is the case, the following problem occurs.

Figure 12:
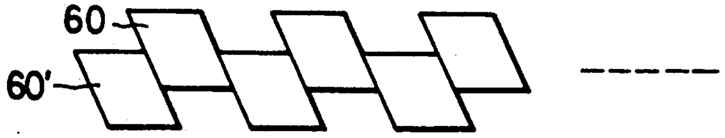

As shown in FIG. 11(*b*), the latent electrostatic image 60 formed by the row A of light-emitting elements is situated a distance of 3 l/2 away from the latent electrostatic image formed by the row B, and a series of electrostatic latent images 60, which should be aligned with the other series of images 60', eventually become offset with the latter. As shown in FIG. 12, the direction of offset that occurs between images 60 and 60' in this case is opposite to the direction of offsetting in the case shown in FIG. 8.

Figure 13A:
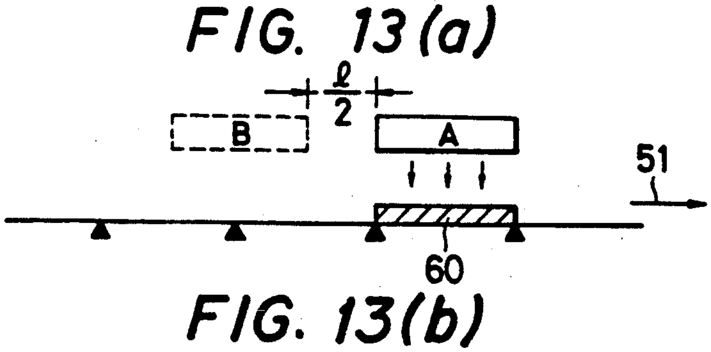
Figure 13B:
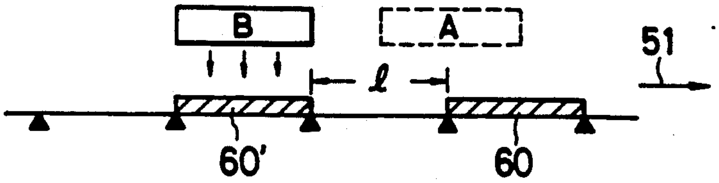

To avoid this problem, the distance between the two rows A and B of light-emitting elements is selected to be at l/2, as shown in FIG. 13.

If, under this condition, a latent electrostatic image 60 is formed by light emission from the row A, as shown in FIG. 13(*a*), followed by light emission from the row B to form a latent electrostatic image 60', then the distance between the two electrostatic images 60 and 60' is equal to l. In this case, dots of developed electrostatic images 60 and 60' are aligned without any offsetting, as shown in FIG. 10.

If the two rows of light-emitting elements are excited under this condition to emit light for a finite duration of time, adjacent dots of latent electrostatic images 60 or 60' partially overlap with each other in the direction of arrow 51, as previously described with reference to FIG. 10. As a result of this overlap between adjacent dots of latent electrostatic images, improved image quality can be achieved by the mechanism already described with reference to FIG. 4.

Figure 14:
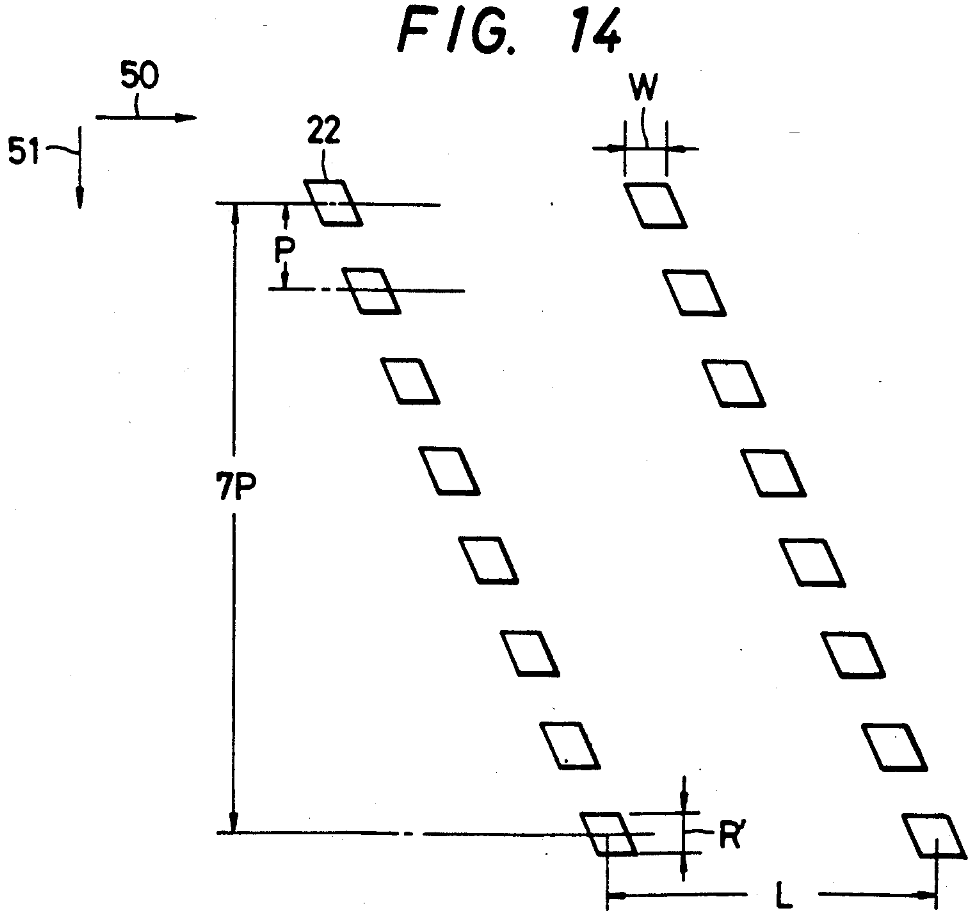
FIG. 14 shows schematically the arrangement of light-emitting elements in an optical writing head according to a second embodiment of the present invention.

FIG. 14 shows the layout and dimensions of eight rows of light-emitting elements employed in an optical writing head. The size W of each light-emitting element 22 in the row direction is 0.085 mm and the size R' in the direction perpendicular to the row direction is 0.1 mm. Any two adjacent elements in each row are arranged at a pitch L of 0.68 mm in the row direction, and the distance P between the center lines of adjacent rows is 0.18 mm.

In the embodiment shown in FIG. 14, the value of P is selected to be 2.125 times the pitch l at which the dots of latent electrostatic images are arranged.

In the embodiment shown in FIG. 9, P is determined to have a value that is equal to 1.875 times the value of l. In this latter case, P is 0.16 mm.

If the method described above is employed, dotted latent electrostatic images are formed on the surface of a photoreceptor by light emission from light-emitting elements and the individual dots are arranged in such a way that no gap is left between any two adjacent elements in the row direction and adjacent elements partially overlap with each other in the direction perpendicular to the row direction.

In the writing method of the present invention, a common anode electrode is provided for a plurality of light-emitting elements so that they can be selectively excited to emit light on a time-sharing basis. This offers an incidental advantage of reducing the increase in the temperature of the phosphor of which the light-emitting elements are made. As a consequence, the potential of the anode electrodes can be increased to a higher level than in the case where an anode electrode is connected to each light-emitting element. This contributes to a higher instantaneous luminance that can be provided by each light-emitting element.

The optical writing method of the present invention is by no means limited to the embodiments already described and various modifications can be made without departing from the spirit and scope of the present invention.

For example, the light-emitting elements to be employed may be any device such as an array of light-emitting diodes (LED) or an optical writing device using a liquid-crystal shutter.

What is claimed is:

1. In an optical writing apparatus having an optical write head for an electrostatic recorder adapted to form a latent image on photosensitive material moving relative thereto, said optical write head comprising:

at least two parallel rows of light-emitting elements, each row having a center line, said elements being spaced at a first predetermined pitch measured in a direction perpendicular to the direction of the center line, each of said rows being separated by a second predetermined pitch corresponding to the distance between the center line of adjacent rows, measured in the direction perpendicular to the direction of the center line;

dynamic driving circuit means for activating the rows of light emitting elements at different times to emit light successively, array by array, in the order from a first array to a second array to irradiate the photosensitive material for forming a latent image comprised of a matrix of dots arranged regularly in the center line direction and in the direction perpendicular to the center line direction, a latent image of one line comprised of dots arranged in a direction perpendicular to the center line direction being formed on a photosensitive material once each of the rows of light emitting elements emits light, said matrix of dots arranged such that any two adjacent dots of latent electrostatic image partially overlap each other in the center line direction so as to add the decreased light energy of the edge of the dotted latent electrostatic image to the decreased light energy of the edge of the adjacent dotted latent electrostatic image, a width of the overlap between the two adjacent dots is selected to be within the square root of two times the dot width in the same direction as the overlap.

2. An optical writing apparatus according to claim 1, wherein said second predetermined pitch is substantially equal to one half of said first predetermined pitch.

3. An optical writing apparatus according to claim 1, wherein said second predetermined pitch is substantially equal to 2.125 times the first predetermined pitch.

4. An optical writing apparatus according to claim 1, wherein said second predetermined pitch is substantially equal to 1.875 times the first predetermined pitch at which the dotted latent electrostatic images are written on the photoreceptor.

5. An optical writing apparatus according to claim 1, wherein one row of said light-emitting elements is connected to a common anode electrode.

6. An optical writing method, comprising the steps of:

providing at least two parallel rows of light-emitting elements arranged at a predetermined pitch, each row having a center line, said light-emitting elements being arranged such that they are aligned at equal predetermined pitches when viewed in a direction perpendicular to the direction of the center line;

exciting the light-emitting elements at different times to emit light successively, array by array, in the order from a first array to a second array to irradiate the photosensitive material for forming a latent image comprised of a matrix of dots arranged regularly in the center line direction and in the direction perpendicular to the center line direction;

scanning the photoreceptor in a direction perpendicular to the row direction of the light-emitting elements for writing a line of dotted latent electrostatic images on the photoreceptor once the light emissions from all the rows have been completed as a result of a single light emission from each row, wherein any two adjacent dots of latent electrostatic image partially overlap each other in the center line direction so as to add the decreased light energy of the edge of the dotted latent electrostatic image to the decreased light energy of the edge of the adjacent dotted latent electrostatic image, a width of the overlap between the two adjacent dots is selected to be within the square root of two times the dot width in the same direction as the overlap.

* * * * *